(12) United States Patent
Tsukamoto

(10) Patent No.: US 6,262,847 B1
(45) Date of Patent: Jul. 17, 2001

(54) OPTICAL ELEMENT, METHOD FOR PRODUCING OPTICAL ELEMENT, AND OPTICAL SYSTEM HAVING THE OPTICAL ELEMENT

(75) Inventor: Seitoku Tsukamoto, deceased, late of Yokohama (JP), by Mayumi Tsukamoto, legal representative

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,678

(22) Filed: Nov. 30, 1999

(30) Foreign Application Priority Data

Dec. 1, 1998 (JP) .................................................. 10-356939

(51) Int. Cl.$^7$ ................................. G02B 1/10; F21V 9/04; B05D 5/06

(52) U.S. Cl. .......................... 359/584; 359/585; 359/586; 359/360; 359/359; 427/162; 427/164

(58) Field of Search ..................................... 359/359, 360, 359/580, 584, 585; 427/162, 166, 561

(56) References Cited

U.S. PATENT DOCUMENTS 5,267,081 * 11/1993 Pein ....................................... 359/584
5,582,879 * 12/1996 Fujimura et al. ..................... 427/561

* cited by examiner

Primary Examiner—Audrey Chang
(74) Attorney, Agent, or Firm—Fitzpatrick, Cella, Harper & Scinto

(57) ABSTRACT

An optical element has a transparent substrate, an undercoat formed on the substrate, wherein the undercoat comprises dielectric multi-layered films, each film having a thickness in a range of 50 to 100 nm, and a reflective film formed on the undercoat.

10 Claims, 3 Drawing Sheets

OPTICAL ELEMENT, METHOD FOR PRODUCING OPTICAL ELEMENT, AND OPTICAL SYSTEM HAVING THE OPTICAL ELEMENT

BACKGROUND OF THE INVENTION

1. Field of the Invention

The present invention relates to an optical element (mirror) making use of internal reflection, which is used in optical instruments (optical apparatus) such as cameras, copiers, printer exposure apparatuses and so on, and a method for producing the optical element.

2. Related Background Art

There have been proposals of optical members (plane mirrors and curved mirrors) of the internal reflection type in which light was incident to one surface of a transparent substrate and in which the light was reflected inside the substrate by a reflecting film formed on the other surface of the transparent substrate.

In general, ordinary mirrors of the internal reflection type used in optical instruments are those obtained by forming a reflecting film of metal such as Al (aluminum), Ag (silver), or the like having high reflectances in the visible light region, on a substrate and then laying a protective film of a dielectric film or a metal film thereon or a protective film of a coating film thereon.

The internal reflection type mirrors of Al according to the conventional technology, however, were apt to have low reflectances throughout the entire wavelength range and particularly in the long wavelength region. Further, the Ag films had relatively high spectral reflectances, but were apt to decrease the reflectances in the short wavelength region when subjected to an ion bombardment cleaning operation or the like for enhancing adhesion. A photographing optical system using a lot of such internal reflection type mirrors had a problem that transmitted light thereby was light of colored spectral characteristics.

Also, the protective film of the coating film required a new device or jig separate from an evaporation system used for formation of the metal film. This posed problems that the production steps became complex and that the cost of the production apparatus was high.

SUMMARY OF THE INVENTION

An object of the present invention is to provide an optical element that can be produced at low cost and simply and that has high reflectances, and a method for producing the optical element.

A further object of the present invention is to provide an optical system having the optical element with high reflectances.

An optical element of the present invention comprises a transparent substrate, an undercoat formed on the substrate, and a reflective film formed on the undercoat. The undercoat includes and the undercoat comprises dielectric multilayered films, each film having a thickness in the range of 50 to 100 nm.

A method for producing an optical element according to the present invention comprises a step of forming an undercoat on a transparent substrate and a step of forming a reflective film on the undercoat, and the steps are carried out continuously without heating the substrate.

An optical system of the present invention comprises the optical element of the present invention or the optical element produced by the method for producing the optical element according to the present invention.

DETAILED DESCRIPTION OF THE PREFERRED EMBODIMENTS

Figure 1:
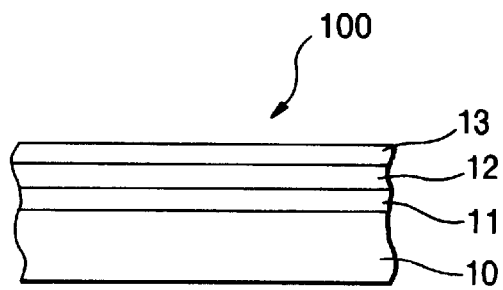
FIG. 1 is a schematic structural diagram of an internal reflection type optical element of an embodiment of the present invention.

An internal reflection type optical element 100 of an embodiment of the present Invention illustrated in FIG. 1 has an undercoat 11 formed on a surface of a transparent plane or curved substrate 10, a reflective film 12 of metal formed on the undercoat 11, and an overcoat 13 formed on the reflective film 12. The undercoat 11 is made of a plurality of dielectric materials, each layer having the thickness in the range of 50 to 100 nm.

Metals preferably used for the reflective film 12 of metal are Al (aluminum) and Ag (silver).

The undercoat 11 comprised of the plural layers of dielectric materials works to increase the reflectances on the internal surface side of the reflective film 12 of metal. The thickness of each layer is set in the range of 50 to 100 nm, whereby the reflectance is increased selectively at the wavelengths in the visible region and whereby flat spectral reflection characteristics are achieved. The dielectric materials are selected from $SiO$, $SiO_2$, $Al_2O_3$, $ZrO_2$, $TiO_2$, $Ta_2O_5$, and mixtures thereof. Thus, the internal reflection type optical element 100 can be made with better optical characteristics of the reflective film 12 and without possibilities of considerable decrease of reflectances and coloring even if placed under high temperature and high humidity circumstances for a long time.

Figure 2:
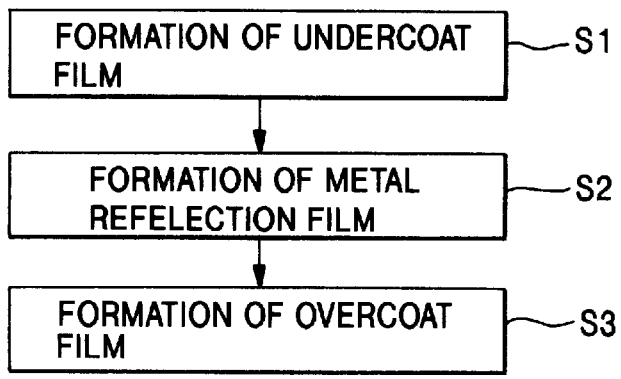
FIG. 2 is a flowchart to show a method for producing an internal reflection type optical element according to an embodiment of the present invention.

A method for producing an internal reflection type optical element according to an embodiment of the present invention, which is illustrated in FIG. 2, has a step S1 of forming the undercoat on the surface of the transparent substrate, a step S2 of forming the reflective film of metal on the undercoat thus formed, and a step S3 of forming the overcoat on the reflective film of metal thus formed. The steps are carried out continuously without heating the substrate.

Since all the formation steps are carried out continuously without heating the substrate, as described above, heating and cooling steps are unnecessary midway in the process; therefore, the production steps become simple and there is no possibility of necessitating a complex production apparatus.

Figure 3:
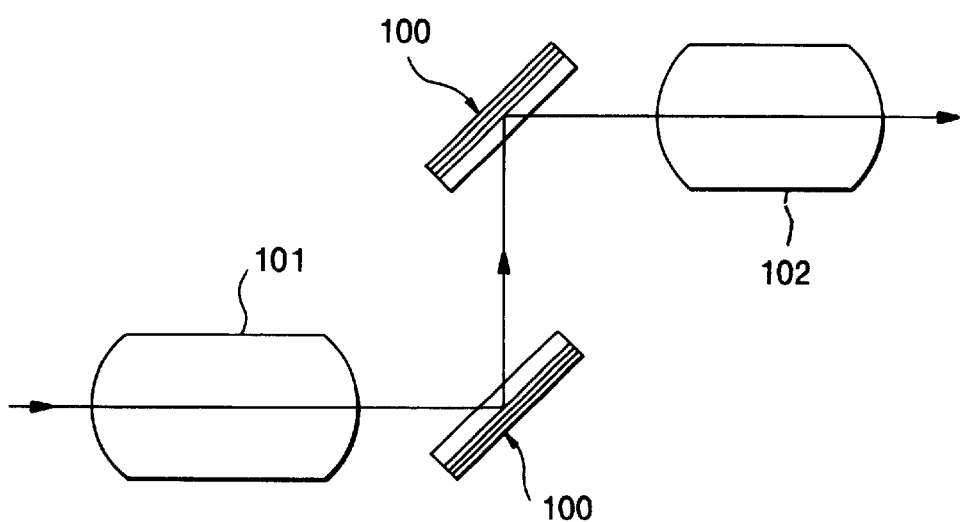
FIG. 3 is a schematic structural diagram of an optical system having the internal reflection type optical elements of FIG. 1 or the internal reflection type optical elements produced by the production method of FIG. 2.

An optical system of an embodiment of the present invention illustrated in FIG. 3 incorporates optical elements 100 of FIG. 1 or the optical elements 100 produced by the production method explained with FIG. 2, as components. In FIG. 3, numerals 101 and 102 designate optical elements such as refracting elements, reflecting elements, diffracting elements, or the like, other than the optical elements 100.

An embodiment of the present invention will be described below in further detail with reference to FIGS. 4 and 5.

Figure 4:
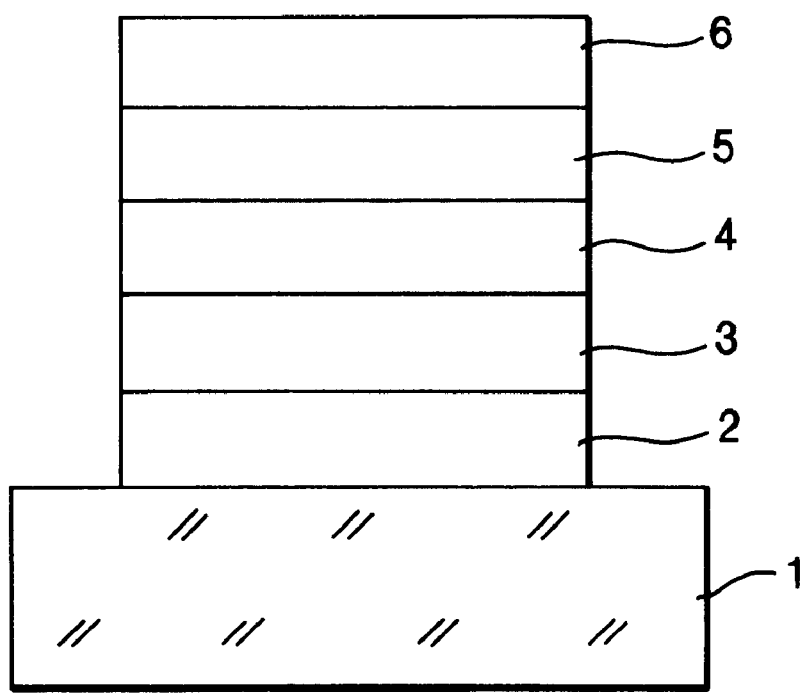
FIG. 4 is a schematic sectional view to show the film structure of an internal reflection type optical element as an embodiment of the present invention.

FIG. 4 is a schematic sectional diagram to show an internal reflection mirror according to Embodiment 1 of the present invention. This mirror is composed of an undercoat comprised of three layered films on the surface of transparent substrate 1 of polyolefin resin. The three layered films are an SiO film 2 having the refractive index approximately equal to that of the substrate 1, a $ZrO_2$ film 3 containing a principal component of $ZrO_2$ and having the refractive index higher than that of the substrate 1, and an $SiO_2$ film 4 having the refractive index lower than that of the substrate 1. The mirror also includes the reflective film 5 of Al on the undercoat, and the overcoat of SiO film 6 on the reflective film 5.

The refractive index of the SiO film 2 of the undercoat can be controlled by partial pressure of oxygen in a film-forming chamber or the like, and the substrate 1 is made of a plastic material or the like such as the polyolefin resin, the acrylic resin, or the like, to enhance the adhesion to the SiO film 2. In order to relax deformation due to thermal expansion or moisture-absorption expansion of the plastic material of the substrate 1, the SiO film 2 is formed while controlling internal stress of the film. The SiO film 2 can also be omitted if the substrate is made of a glass material with little deformation.

Among the films of the undercoat, the $ZrO_2$ film 3 containing the principal component of $ZrO_2$ and having the refractive index higher than that of the substrate 1, and the $SiO_2$ film 4 having the refractive index lower than that of the substrate 1 increase the reflectances on the internal surface side of the reflective film 5 of Al and more selectively at the wavelengths in the visible light region. An appropriate range of the thickness of each layer of the undercoat is the range of 50 to 100 nm. If the thickness is not more than 50 nm, the reflection enhancing effect will be low. If the thickness is not less than 100 nm, the reflectances will be increased in the long wavelength region, and will fail to obtain the flat spectral reflection characteristics in the visible light region.

The reflective film 5 of Al has a thickness preferably in the range of 50 to 150 nm and must preferably in the range of 60 to 120 nm, in order to serve as a high-reflection metal mirror. The sufficient reflectances will not be gained in the thickness range of less than 50 nm. The reflectances will not be increased more but the adhesion will be degraded in the thickness range greater than 150 nm.

The forming steps of the respective layers are carried out continuously without heating the substrate by vacuum evaporation, after evacuation to a vacuum. After completion of the forming steps, the substrate can be taken out of the vacuum chamber. Therefore, the production steps become simple.

Specific numerical examples will be explained below.

EXAMPLE 1

The transparent substrate of polyolefin resin was put in a vacuum evaporation apparatus and the apparatus was evacuated down to the pressure of $1 \times 10^{-3}$ Pa or lower without heating the substrate. After that, oxygen gas was introduced into the apparatus to adjust the pressure to $1 \times 10^{-2}$ Pa, and the SiO film for the undercoat was formed in the thickness of 80 nm. Then, the oxygen gas was adjusted to the pressure of $5 \times 10^{-3}$ Pa and then the $ZrO_2$ film containing the principal component of $ZrO_2$ and having the refractive index higher than that of the substrate was formed in the thickness of 80 nm. Then, the $SiO_2$ film having the refractive index lower than that of the substrate was formed in the thickness of 80 nm. The above formed the undercoat. Then the oxygen gas was stopped and the reflective film of Al was formed in the thickness of 100 nm in under the pressure of not more than $1 \times 10^{-3}$ Pa. Further, the oxygen gas was introduced to adjust the pressure to $1 \times 10^{-2}$ Pa, and then the SiO film of the overcoat was formed in the thickness of 10 nm. After that, the mirror was taken out of the vacuum evaporation apparatus.

Figure 5:
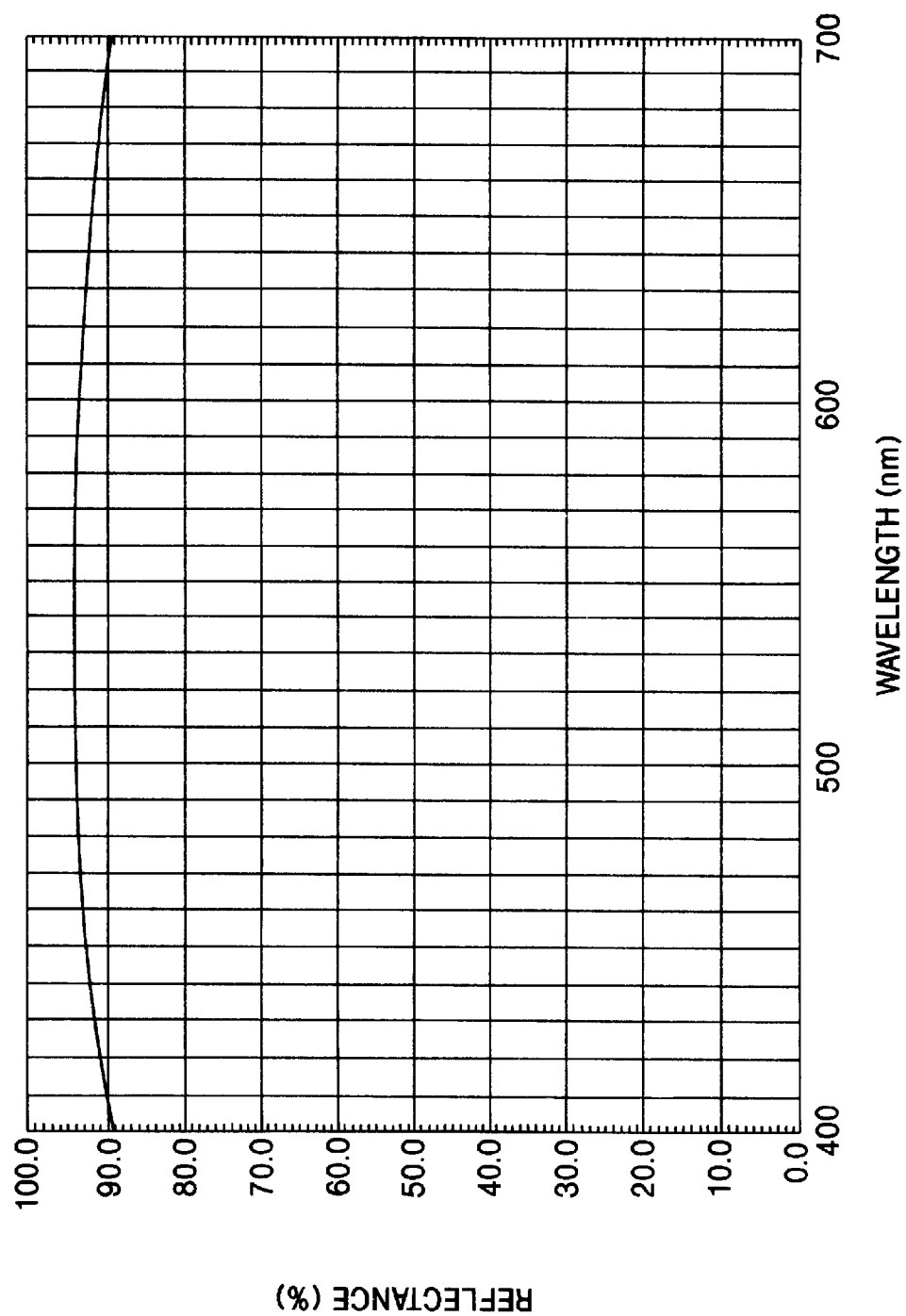
FIG. 5 is a graph to show the reflectance characteristics of an internal reflection type optical element as an embodiment of the present invention.

FIG. 5 is a graph showing the spectral reflectances at the incidence angle of 25°, of the internal reflection mirror of the present example produced by the above method. As apparent from this figure, the internal reflection mirror of the present example, immediately after the production, has an extremely high reflectance, over 90% at the wavelength of 500 nm and uniform reflectance distribution in the wide wavelength region. In quality evaluation tests immediately after the production (hereinafter referred to as "initial evaluation tests") which will be described hereinafter, the internal reflection mirror of the present example demonstrated good results in all the tests of total result as a resultant of reflections on the six surfaces (six films), solvent resistance, and adhesivity in the state immediately after the production. In quality evaluation tests for evaluating secular change of appearance and reflectance (hereinafter referred to as "secular evaluation tests"), it was verified that the internal reflection mirror of the present example had no possibility of a large change in either of appearance and reflectance.

EXAMPLE 2

The transparent substrate of acrylic resin was put in the vacuum evaporation apparatus and the apparatus was evacuated down to the pressure of $1 \times 10^{-3}$ Pa or lower without heating the substrate. After that, oxygen gas was introduced into the apparatus to adjust the pressure to $1.2 \times 10^{-2}$ Pa, and then the SiO film for the undercoat was formed in the thickness of 80 nm. Then, the oxygen gas was adjusted to the pressure of $5 \times 10^{-3}$ Pa and then the $TiO_2$ film containing the principal component of $TiO_2$ and having the refractive index higher than that of the substrate was formed in the thickness of 80 nm. Then, the $SiO_2$ film having the refractive index lower than that of the substrate was formed in the thickness of 80 nm. The above formed the undercoat. Then, the oxygen gas was stopped and the reflective film of Al was formed in the thickness of 100 nm under the pressure of not more than $1 \times 10^{-3}$ Pa. Further, the oxygen gas was introduced to adjust the pressure to $1 \times 10^{-2}$ Pa, and then the SiO film of the overcoat was formed in the thickness of 10 nm. After that, the mirror was taken out of the vacuum evaporation apparatus. The internal reflection mirror of the present example also showed good results in the initial evaluation tests and secular evaluation tests as the mirror of Example 1 did.

EXAMPLE 3

The transparent substrate of polyolefin resin was put in the vacuum evaporation apparatus and the apparatus was evacuated down to the pressure of $1 \times 10^{-3}$ Pa or lower without heating the substrate. After that, oxygen gas was introduced into the apparatus to adjust the pressure to $1 \times 10^{-2}$ Pa, and then the SiO film for the undercoat was formed in the thickness of 80 nm. Then, the oxygen gas was adjusted to the pressure of $5\times10^{-3}$ Pa, and then the following films were deposited in the following order: a $ZrO_2$ film containing the principal component of $ZrO_2$ and having the refractive index higher than that of the substrate in the thickness of 75 nm, an $SiO_2$ film having the refractive index lower than that of the substrate in the thickness of 95 nm, a $ZrO_2$ film containing the principal component of $ZrO_2$ and having the refractive index higher than that of the substrate in the thickness of 75 nm, and an $SiO_2$ film having the refractive index lower than that of the substrate in the thickness of 75 nm. In this way, the undercoat was formed of the five layered films. Then, the oxygen gas was stopped and the reflective film of Al was formed in the thickness of 100 nm under the pressure of not more than $1\times10^{-3}$ Pa. Further, the oxygen gas was introduced to adjust the pressure to $1\times10^{-2}$ Pa, and then the SiO film of the overcoat was formed in the thickness of 10 nm. After that, the mirror was taken out of the vacuum evaporation apparatus. In the present example the internal reflection mirror was produced with the undercoat comprised of the five-layered films as described above. The internal reflection mirror of the present example also showed good results in the initial evaluation tests and secular evaluation tests as the mirror of Example 1 did.

For comparison's sake, the following internal reflection mirrors were produced.

COMPARATIVE EXAMPLE 1

The transparent substrate of polyolefin resin was put in the vacuum evaporation apparatus and the apparatus was evacuated down to the pressure of $1\times10^{-3}$ Pa or lower without heating the substrate. After that, oxygen gas was introduced into the apparatus to adjust the pressure to $1\times10^{-2}$ Pa, and the SiO film for the undercoat was formed in the thickness of 80 nm. Then, the oxygen gas was stopped and the reflective film of Al was formed in the thickness of 100 nm under the pressure of not more than $1\times10^{-3}$ Pa. Further, the oxygen gas was introduced to adjust the pressure to $1\times10^{-2}$ Pa, and then the SiO film of the overcoat was formed in the thickness of 10 nm. After that, the mirror was taken out of the vacuum evaporation apparatus. As described above, the internal reflection mirror was produced with the undercoat comprised of a single-layer film. In the results of the initial evaluation tests, the internal reflection mirror of Comparative Example 1 showed low reflectance.

COMPARATIVE EXAMPLE 2

The transparent substrate of polyolefin resin was put in the vacuum evaporation apparatus and the apparatus was evacuated down to the pressure of $1\times10^{-3}$ Pa or lower without heating the substrate. After that, oxygen gas was introduced into the apparatus to adjust the pressure to $1\times10^{-2}$ Pa, and the SiO film for the undercoat was formed in the thickness of 80 nm. Then, the oxygen gas was adjusted to the pressure of $5\times10^{-3}$ Pa and the $ZrO_2$ film containing the principal component of $ZrO_2$ and having the refractive index higher than that of the substrate was formed in the thickness of 40 nm. Then, the $SiO_2$ film having the refractive index lower than that of the substrate was formed in the thickness of 40 nm. The above formed the undercoat. Then, the oxygen gas was stopped and the reflective film of Al was formed in the thickness of 100 nm under the pressure of not more than $1\times10^{-3}$ Pa. Further, the oxygen gas was introduced to adjust the pressure to $1\times10^{-2}$ Pa, and then the SiO film of the overcoat was formed in the thickness of 10 nm. After that, the mirror was taken out of the vacuum evaporation apparatus. In the results of the initial evaluation tests, the internal reflection mirror of Comparative Example 2 showed low reflectance on the long wavelength side.

COMPARATIVE EXAMPLE 3

The transparent substrate of polyolefin resin was put in the vacuum evaporation apparatus and the apparatus was evacuated down to the pressure of $1\times10^{-3}$ Pa or lower without heating the substrate. After that, oxygen gas was introduced into the apparatus to adjust the pressure to $1\times10^{-2}$ Pa, and the SiO film for the undercoat was formed in the thickness of 80 nm. Then, the oxygen gas was adjusted to the pressure of $5\times10^{-3}$ Pa and the $ZrO_2$ film containing the principal component of $ZrO_2$ and having the refractive index higher than that of the substrate was formed in the thickness of 100 nm. Then, the $SiO_2$ film having the refractive index lower than that of the substrate was formed in the thickness of 100 nm. The above formed the undercoat. Then, the oxygen gas was stopped and the reflective film of Al was formed in the thickness of 100 nm under the pressure of not more than $1\times10^{-3}$ Pa. Further, the oxygen gas was introduced to adjust the pressure to $1\times10^{-2}$ Pa, and then the SiO film of the overcoat was formed in the thickness of 10 nm. After that, the mirror was taken out of the vacuum evaporation apparatus. In the results of the initial evaluation tests, the internal reflection mirror of Comparative Example 3 showed low reflectance on the short wavelength side.

Table 1 below shows the results of the initial evaluation tests and secular evaluation tests which were carried out for the internal reflection mirrors of the first to third examples and for the internal reflection mirrors of the first to the third comparative examples.

TABLE 1

| Evaluation items | Initial evaluation tests | | | | Secular evaluation tests |
|---|---|---|---|---|---|
| | reflectance (%) | difference of reflectance (%) | solvent resistance | adhesivity | |
| Ex 1 | 66.6 | 0.1 | ◎ | ◎ | ◎ |
| Ex 2 | 68.4 | 1.3 | ◎ | ◎ | ◎ |
| Ex 3 | 81.0 | 0.5 | ◎ | ◎ | ◎ |
| Comp Ex 1 | 44.4 | 8.9 | ◎ | ◎ | ○ |
| Comp Ex 2 | 43.1 | 28.0 | ◎ | ◎ | ◎ |
| Comp Ex 3 | 57.5 | 18.1 | ◎ | ◎ | ◎ |

◎: good
○: acceptable for practical use
△: unacceptable for practical use

In the initial evaluation tests the reflectance is the total reflectance from the six surfaces at the wavelength of 540 nm, and the difference of reflectance is a difference between the total reflectances from the six surfaces at the wavelength 440 nm and at the wavelength 640 nm. The solvent resistance was the result of checking anomaly of appearance after each sample was rubbed by ten returns under the weight of 500 g/cm² with a silvon sheet immersed in a mixed solution of an alcohol-base solvent. The adhesivity was the result of checking the presence or absence of peeling of the film after cellophane tape was attached to the reflective film surface of each sample and peeled off quickly. The secular evaluation tests were the results of checking the anomaly in appearance and the reflectance at the wavelength of 540 nm after a lapse of 500 hours under the environment of the temperature 60° C. and the humidity 90%.

The internal reflection mirrors of the embodiments present the effects described below.

The mirrors have extremely high reflectances and flat spectral reflection characteristics in the visible region and the present invention can realize the optical elements such as plane mirrors, curved mirrors, etc. of the internal reflection type produced by the simple and inexpensive production steps, and the production methods thereof.

Further, the optical system and the optical apparatus incorporating it can be accomplished with the flat spectral characteristics in the visible region.

What is claimed is:

1. An optical element comprising:

a transparent substrate;

an undercoat formed on the substrate, said undercoat comprising a first dielectric layer having a refractive index substantially the same as a refractive index of said substrate, a second dielectric layer having a refractive index higher than the refractive index of said substrate, and a third dielectric layer having a refractive index lower than the refractive index of said substrate, wherein said first, second and third dielectric layers are successively laminated on said substrate in that order and each dielectric layer has a thickness within a range of 50 nm to 100 nm; and a reflective film formed on said undercoat.

2. The optical element according to claim 1, further comprising an overcoat formed on said reflective film.

3. The optical element according to claim 1, wherein said reflective film is a metal film.

4. The optical element according to claim 3, wherein said reflective film is an Al (aluminum) film.

5. The optical element according to claim 3, wherein said reflective film is an Ag (silver) film.

6. The optical element according to claim 1, wherein each of said first, second and third dielectric layers comprises a material selected from the group consisting of SiO, $SiO_2$, $Al_2O_3$, $ZrO_2$, $TiO_2$, $Ta_2O_5$, and mixtures thereof.

7. The optical element according to claim 6, wherein said first dielectric layer consists of SiO, said second dielectric layer consists of one of $ZrO_2$ and $TiO_2$, and said third dielectric layer consists of $SiO_2$.

8. The optical element according to claim 1, wherein said undercoat further comprises:

a fourth dielectric layer having a refractive index higher than the refractive index of said substrate; and a fifth dielectric layer having a refractive index lower than the refractive index of said substrate, wherein said forth and fifth dielectric layers are successively laminated on said third dielectric layer.

9. The optical element according to claim 8, wherein each of said first, second, third, fourth and fifth dielectric layers comprises a material selected from the group consisting of SiO, $SiO_2$, $Al_2O_3$, $ZrO_2$, $TiO_2$, $Ta_2O_5$ and mixtures thereof.

10. The optical element according to claim 9, wherein said first dielectric layer consists of SiO, said second and fourth dielectric layers consist of $ZrO_2$, and said third and fifth dielectric layers consist of $SiO_2$.

* * * * *

UNITED STATES PATENT AND TRADEMARK OFFICE
CERTIFICATE OF CORRECTION

PATENT NO.   : 6,262,847 B1
DATED        : July 17, 2001
INVENTOR(S)  : Seitoku Tsukamoto Page 1 of 1

It is certified that error appears in the above-identified patent and that said Letters Patent is hereby corrected as shown below:

<u>Column 2,</u>
Line 26, "Invention" should read -- invention --.

<u>Column 3,</u>
Line 45, "must" should read -- most --.

Signed and Sealed this

Ninth Day of April, 2002

*Attest:*

*Attesting Officer*

JAMES E. ROGAN
*Director of the United States Patent and Trademark Office*